United States Patent
Xiao et al.

(10) Patent No.: US 10,374,899 B2
(45) Date of Patent: Aug. 6, 2019

(54) METHOD AND DEVICE FOR REPORTING OPENFLOW SWITCH CAPABILITY

(71) Applicant: ZTE CORPORATION, Shenzhen, Guangdong Province (CN)

(72) Inventors: Min Xiao, Shenzhen (CN); Yu Wang, Shenzhen (CN); Junhui Zhang, Shenzhen (CN); Bo Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/552,497

(22) PCT Filed: Mar. 28, 2016

(86) PCT No.: PCT/CN2016/077544
§ 371 (c)(1),
(2) Date: Aug. 22, 2017

(87) PCT Pub. No.: WO2016/177180
PCT Pub. Date: Nov. 10, 2016

(65) Prior Publication Data
US 2018/0337827 A1   Nov. 22, 2018

(30) Foreign Application Priority Data

Jul. 1, 2015 (CN) .......................... 2015 1 0380942

(51) Int. Cl.
*H04L 12/24* (2006.01)
*H04L 29/08* (2006.01)
(Continued)

(52) U.S. Cl.
CPC ...... *H04L 41/0893* (2013.01); *H04L 12/4641* (2013.01); *H04L 29/08* (2013.01);
(Continued)

(58) Field of Classification Search
CPC . H04L 41/0853; H04L 41/0893; H04L 41/16; H04L 29/08; H04L 47/2425; H04L 26/18
See application file for complete search history.

(56) References Cited

U.S. PATENT DOCUMENTS 9,853,870 B2 * 12/2017 Pacella ............... H04L 41/5054
2011/0188373 A1   8/2011 Saito
(Continued)

FOREIGN PATENT DOCUMENTS

CN   102291711 A   12/2011
CN   103200122 A    7/2013
(Continued)

OTHER PUBLICATIONS

OpenFlow Switch Specification, Version 1.5.1 (Protocol version 0x06), Mar. 26, 2015, ONF TS-025, Open Networking Foundation 2015. XP55317414A.
(Continued)

*Primary Examiner* — Gary Mui
(74) *Attorney, Agent, or Firm* — Ling Wu; Stephen Yang; Ling and Yang Intellectual Property (57) ABSTRACT

A method and apparatus for reporting a feature of an OpenFlow switch are provided. The method includes: when the OpenFlow switch learns that an OpenFlow controller needs to query for port information, reporting port group identifiers of port groups, to which each port of the OpenFlow switch or each port to be queried by the OpenFlow controller belongs, to the OpenFlow controller, herein the port groups are obtained by grouping ports with different features in the OpenFlow switch based on one or more feature types, and each of the port groups has a port group identifier.

19 Claims, 5 Drawing Sheets

(51) Int. Cl.
*H04L 12/46* (2006.01)
*H04L 12/851* (2013.01)
*H04L 29/06* (2006.01)

(52) U.S. Cl.
CPC .......... *H04L 41/0853* (2013.01); *H04L 41/16* (2013.01); *H04L 47/2425* (2013.01); *H04L 69/18* (2013.01)

(56) References Cited

U.S. PATENT DOCUMENTS

| | | | |
|---|---|---|---|
| 2013/0272135 A1 | 10/2013 | Leong | |
| 2014/0204940 A1 | 7/2014 | Bestler et al. | |
| 2014/0328180 A1* | 11/2014 | Kim | H04L 47/21 370/235.1 |
| 2014/0328344 A1* | 11/2014 | Bosshart | H04L 45/74 370/392 |
| 2014/0334489 A1* | 11/2014 | Bosshart | H04L 47/56 370/392 |
| 2016/0344633 A1* | 11/2016 | Jiao | H04L 29/06 |
| 2017/0048126 A1* | 2/2017 | Handige Shankar | H04L 41/069 |
| 2018/0063848 A1* | 3/2018 | Ashrafi | H04L 41/0823 |

FOREIGN PATENT DOCUMENTS

| | | |
|---|---|---|
| CN | 104022960 A | 9/2014 |
| CN | 104092604 A | 10/2014 |
| CN | 104158753 A | 11/2014 |
| CN | 104426792 A | 3/2015 |
| CN | 104468462 A | 3/2015 |
| CN | 104702502 A | 6/2015 |
| RU | 2541113 C2 | 2/2015 |

OTHER PUBLICATIONS

Komail Shahmir Shourmasti, Stochastic Switching Using OpenFlow, Jul. 1, 2013. NTNU Department of Telematics, Norwegian University of Science and Technology. XP55323363A.

\* cited by examiner

METHOD AND DEVICE FOR REPORTING OPENFLOW SWITCH CAPABILITY

TECHNICAL FIELD

The present disclosure relates to, but is not limited to, software defined network (SDN) technologies, and more particularly, to a method and apparatus for reporting a feature of an OpenFlow switch.

BACKGROUND

Figure 1:
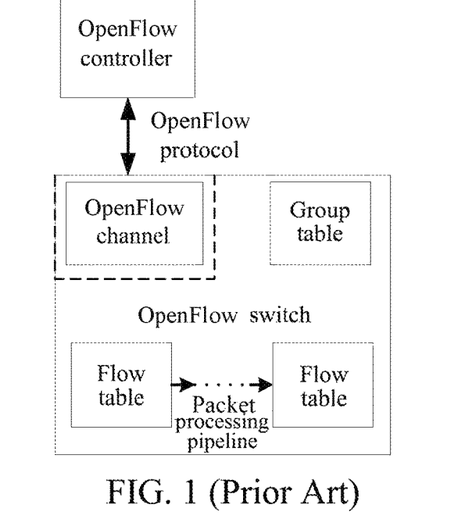
FIG. 1 is a schematic diagram of an architecture of OpenFlow network components according to the related art.

OpenFlow network uses an architecture in which a control plane is separated from a forwarding plane. FIG. 1 is a schematic diagram of an architecture of OpenFlow network components. As shown in FIG. 1, the control plane of the OpenFlow network is implemented by an OpenFlow controller, and the forwarding plane of the OpenFlow network is implemented by an OpenFlow switch, and the OpenFlow protocol is operated between the OpenFlow controller and the OpenFlow switch. The OpenFlow controller issues a flow table and a group table to the OpenFlow switch by using the OpenFlow protocol through an OpenFlow channel, to achieve the objective of controlling data forwarding, and implement separation of the data forwarding and routing control.

According to rules of the OpenFlow protocol specification, since different OpenFlow switches may have different features, after the OpenFlow controller establishes a control connection with the OpenFlow switch, the OpenFlow controller will obtain multiple types of features, which the OpenFlow switch has, by sending multiple types of feature information query messages to the OpenFlow switch. The multiple types of feature information query messages include switch features query messages, table features query messages and group features query messages, etc. When receiving each type of feature information query message sent by the OpenFlow controller, the OpenFlow switch will reply to the OpenFlow controller with the corresponding type of feature information reporting message, including switch features reporting messages, table features reporting messages and group features reporting messages, etc. One or more reported features of the OpenFlow switch include the maximum number of flow tables, the maximum capacity of each of the flow tables, the supported group table types, the maximum capacity of each type of group tables, the match field type that each level of the flow tables can support, the action type that each level of the flow tables can support, and so on. In addition, to obtain port information of the OpenFlow switch, the OpenFlow controller will also send a port information query message to the OpenFlow switch to obtain the port information, such as a port number, port rate, port status, etc., of each port of the OpenFlow switch.

Figure 2:
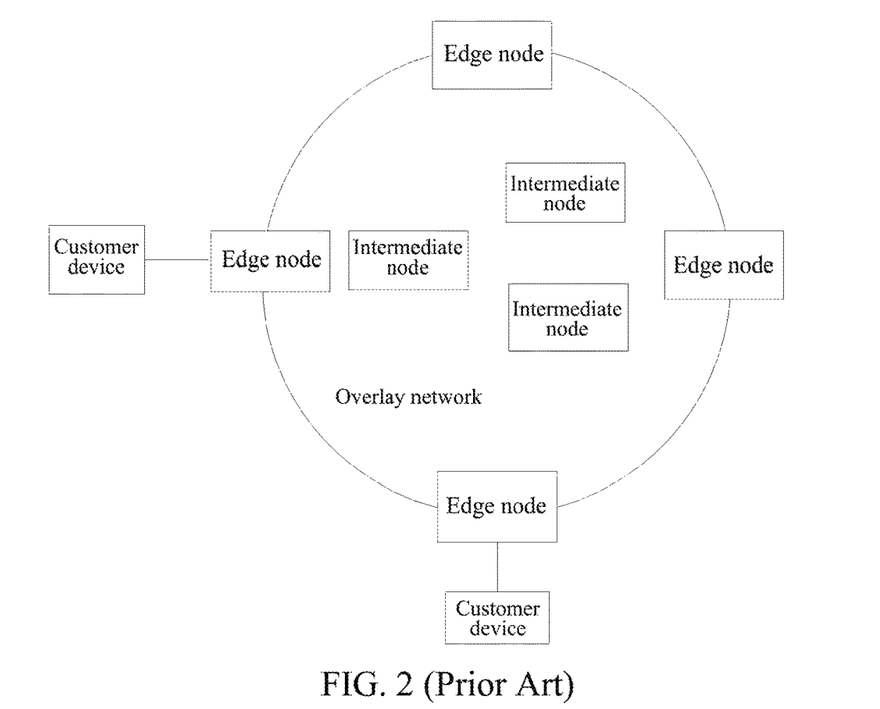
FIG. 2 is a schematic diagram of a structure of an overlay network according to the related art.

Overlay network is a network type that is very widely used. FIG. 2 is a schematic diagram of a structure of the overlay network. As shown in FIG. 2, the overlay network contains two different types of network nodes, i.e., edge nodes and intermediate nodes. Customer devices are connected to the edge nodes to access the overlay network. The edge nodes will add outer encapsulations to all data packets entering the overlay network. The outer encapsulations contain outer source addresses and outer destination addresses for forwarding of the intermediate nodes. Herein, the outer source addresses point to local edge nodes that add the outer encapsulations, and the outer destination addresses point to remote edge nodes. After receiving the data packets with the added outer encapsulations, the remote edge nodes will firstly remove the outer encapsulations of the data packets, and then send the data packets, of which the outer encapsulations are removed, to the connected customer devices.

At present, the overlay network technology is used a lot in data center networks, and a large number of data center servers used as customer devices, are interconnected through the overlay network technology. There are a number of overlay network encapsulation protocols in the related art that have been standardized and have not been standardized yet, including Virtual Extensible Local Area Network (VxLAN) encapsulation specified in Request For Comments (RFC) 7348 issued by in the Internet Engineering Task Force (IETF), Transparent Interconnection of Lots of Links (Trill) encapsulation specified in RFC 6325, Generic User Datagram Protocol (UDP) Encapsulation specified in IETF drafts-ietf-nvo3-gue, Generic Network Virtualization Encapsulation (GENEVE) specified in IETF draft-ietf-nvo3-geneve, Provider Backbone Bridging (PBB) encapsulation specified in 802.1ah issued by Institute of Electrical and Electronics Engineers (IEEE), etc. Server resources of a data center may be leased to a number of different tenants, and the different tenants may ask to use different overly network encapsulation protocols to implement the interconnection of servers belonging to the tenants. For example, a tenant A asks to use the VxLAN encapsulation, and a tenant B asks to use the Trill encapsulation, and a tenant C asks to use the GUE encapsulation, and a tenant D asks to use the PBB encapsulation, etc. To meet the requirements described above, different line cards of the OpenFlow switch, which is used as overlay network nodes, containing multiple line cards need to be capable of supporting different overlay network encapsulation protocols, for example, a line card a supports the VxLAN encapsulation, and a line card b supports the Trill encapsulation, and a line card c supports the GUE encapsulation, and a line card d supports the PBB encapsulation, etc. According to the related art, the edge nodes that support the OpenFlow in the overlay network cannot implement reporting of different features of different line cards in the nodes to the OpenFlow controller respectively.

For the problem that the OpenFlow protocol cannot implement reporting of different features of different line cards in the OpenFlow switch to the OpenFlow controller respectively, an effective solution has not yet been put forward.

SUMMARY

The following is a summary of the subject matter described herein in detail. This summary is not intended to limit the protection scope of the claims.

An embodiment of the present disclosure provides a method for reporting a feature of an OpenFlow switch, to be capable of implementing reporting of different features of different line cards in the OpenFlow switch to the OpenFlow controller respectively.

An embodiment of the present disclosure proposes a method for reporting a feature of an OpenFlow switch, including:

when the OpenFlow switch learns that an OpenFlow controller needs to query for port information, reporting port group identifiers of port groups, to which each port of the OpenFlow switch or each port to be queried by the OpenFlow controller belongs, to the OpenFlow controller, herein port groups are obtained by grouping ports with different features in the OpenFlow switch based on one or more feature types, and each of the port groups has a port group identifier.

In an exemplary embodiment, when the OpenFlow switch learns that the OpenFlow controller needs to query for feature information of a first feature type, the method further includes:

reporting, by the OpenFlow switch, the port group identifier of each of the port groups, obtained by grouping based on the first feature type, to the OpenFlow controller.

In an exemplary embodiment, before the method, further including:

grouping, by the OpenFlow switch, the ports with different features based on the one or more feature types and assigning the port group identifier to each port group.

In an exemplary embodiment, the port group identifiers of the port groups to which each port belongs includes:

the number of contained port group identifiers, and a value of each of the port group identifiers.

In an exemplary embodiment, the feature types include one of:

table features and group features.

In an exemplary embodiment, the one or more feature types on which the grouping is based include one or more feature types with feature differences between the ports in the OpenFlow switch.

In an exemplary embodiment, there is no overlap between value ranges of port group identifiers corresponding to different feature types.

In an exemplary embodiment, reporting, by the OpenFlow switch, the port group identifier of each of the port groups, obtained by grouping based on the first feature type, to the OpenFlow controller includes:

replying, by the OpenFlow switch, to the OpenFlow controller with N feature information reporting messages of the first feature type, herein N is the number of the port groups obtained by grouping based on the first feature type, and each feature information reporting message contains a port group identifier, and the port group identifier contained in the each feature information reporting message is different from each other and belongs to a port group identifier of a port group obtained by grouping based on the first feature type.

In an exemplary embodiment, reporting, by the OpenFlow switch, the port group identifier of each of the port groups, obtained by grouping based on the first feature type, to the OpenFlow controller includes:

replying, by The OpenFlow switch, to the OpenFlow controller with one feature information reporting message of the first feature type, herein feature information carried in the feature information reporting message contains port group identifier/identifiers of one or more port groups obtained by grouping based on the first feature type.

An embodiment of the present disclosure further provides a computer readable storage medium where computer-executable instructions are stored, and the computer-executable instructions are used to execute any method described above.

An apparatus for reporting a feature of an OpenFlow switch is provided in the OpenFlow switch and includes:

a first reporting module configured to, when learning that an OpenFlow controller needs to query for port information, report port group identifiers of port groups, to which each port of the OpenFlow switch or each port to be queried by the OpenFlow controller belongs, to the OpenFlow controller, herein port groups are obtained by grouping ports with different features in the OpenFlow switch based on one or more feature types, and each of the port groups has a port group identifier.

In an exemplary embodiment, the apparatus further includes:

a second reporting module configured to, when learning that the OpenFlow controller needs to query for feature information of a first feature type, report the port group identifier of each of the port groups, obtained by grouping based on the first feature type, to the OpenFlow controller.

In an exemplary embodiment, the apparatus further includes:

a grouping module configured to group the ports with different features based on the one or more feature types, and assign the port group identifier to each port group.

In an exemplary embodiment, the port group identifiers of the port groups to which each port belongs includes:

the number of contained port group identifiers, and a value of each of the port group identifiers.

In an exemplary embodiment, the feature types include one of:

table features and group features.

In an exemplary embodiment, the one or more feature types on which the grouping is based include one or more feature types with feature differences between the ports in the OpenFlow switch.

In an exemplary embodiment, there is no overlap between value ranges of port group identifiers corresponding to different feature types.

In an exemplary embodiment, the second reporting module is configured to report the port group identifier of each of the port groups, obtained by grouping based on the first feature type, to the OpenFlow controller by the following manner:

the first reporting module replies to the OpenFlow controller with N feature information reporting messages of the first feature type, herein N is the number of the port groups obtained by grouping based on the first feature type, and each feature information reporting message contains a port group identifier, and the port group identifier contained in each feature information reporting message is different from each other and belongs to a port group identifier of a port group obtained by grouping based on the first feature type.

In an exemplary embodiment, the second reporting module is configured to report the port group identifier of each of the port groups, obtained by grouping based on the first feature type, to the OpenFlow controller by the following manner:

the second reporting module replies to the OpenFlow controller with one feature information reporting message of the first feature type, herein feature information carried in the feature information reporting message contains port group identifier/identifiers of one or more port groups obtained by grouping based on the first feature type.

The present disclosure provides a scheme for reporting a feature of the OpenFlow switch. According to the scheme for reporting a feature of the OpenFlow switch, the OpenFlow switch groups ports with different features based on one or more feature types and assigns a port group identifier to each port group, and then the port group identifier is added respectively to port information and feature information of different types, which are reported by the OpenFlow switch to a OpenFlow controller, such that the OpenFlow switch can report features of each group of ports for different feature types to the OpenFlow controller, respectively, thereby greatly increasing the flexibility of reporting of the features of the OpenFlow switch, and be capable of supporting the reporting of the features of the OpenFlow switch with the granularity of the port group.

Other features and advantages of the present disclosure will be described in the following description, and will become obvious partly from the description, or be understood by implementing the present disclosure. The purpose and other advantages of the present disclosure can be implemented and obtained by the structure which is specified in the description, claims and accompanying drawings.

After the accompanying drawings and detailed description are read and understood, other aspects can be understood.

DETAILED DESCRIPTION

The technical scheme of the present disclosure will be described in detail in combination with the accompanying drawings and embodiments below.

It needs to be noted that if there is no conflict, the embodiments of the present disclosure and the various features in the embodiments can be combined with each other, which are all within the scope of protection of the present disclosure. Furthermore, although a logical order is given in flow charts, in some cases, the steps shown or described herein may be executed in a different order.

Figure 3:
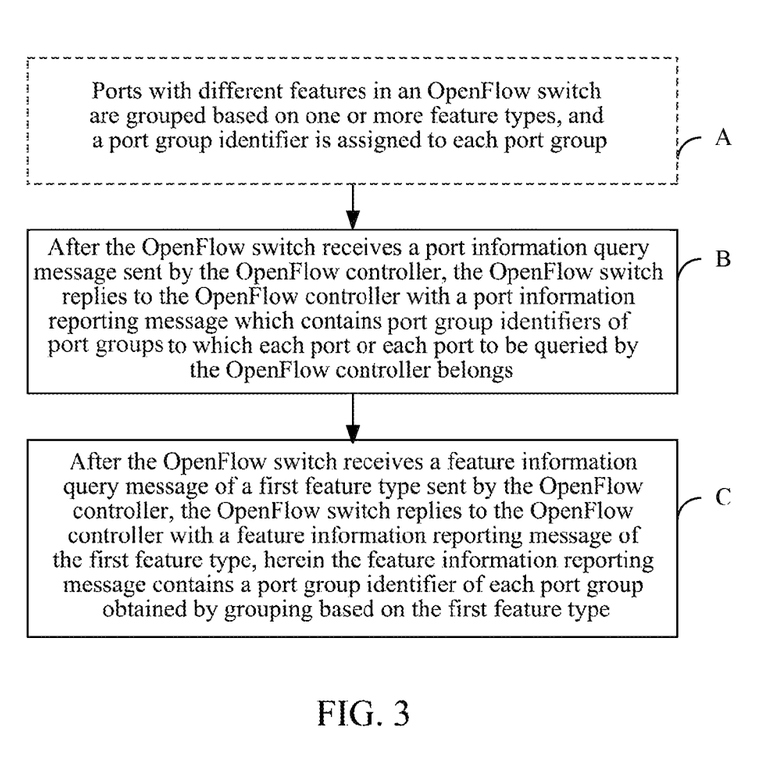
FIG. 3 is a flow chart of a method for reporting a feature of an OpenFlow switch according to an embodiment one of the present disclosure.

The embodiment one provides a method for reporting a feature of an OpenFlow switch feature. As shown in FIG. 3, the method includes the following steps A-C.

In step A, ports with different features in the OpenFlow switch are grouped based on one or more feature types and a port group identifier is assigned to each port group.

The step A, which may be used as an optional step (the step A in FIG. 3 is denoted by a dashed box, indicating that the step is optional), and may be performed after the OpenFlow switch is powered on, or the grouping situation and the assigned port group identifier may be stored in advance in the OpenFlow switch as configuration information.

The feature types include at least one of:
table features and group features.

In an exemplary embodiment, the step A may be, but not limited to, completed by the OpenFlow switch. In other implementing schemes of the present embodiment, the step A may also be implemented by manual pre-configuration, or the step A may be implemented by devices other than the OpenFlow switch.

In an exemplary embodiment, if features of a port change, the step A may be triggered to be re-performed, that is, the ports are re-grouped and the port group identifiers are re-assigned. Or the step A may be performed periodically to ensure that the grouping situation can be updated in time when the features of a port change.

Since the OpenFlow protocol specifies a variety of feature types, and each of the ports will be tagged with a port group identifier whenever the ports with different features are grouped based on one feature type, each of the ports may be tapped with one or more port group identifiers.

In an exemplary embodiment, if all the ports have the same feature for a certain feature type, the ports may not be grouped based on that feature type, and the ports are not required to be tagged with a port group identifier for that feature type, i.e., the one or more feature types described in step A are only limited to one or more feature types with feature differences between the ports in the OpenFlow switch. For example, if table features supported by all line cards in the OpenFlow switch are identical, then the ports may not be grouped for the table feature type and the port group identifiers may not be assigned.

In other implementing schemes of the present embodiment, step A may also be performed for all of the one or more feature types regardless of whether all of the ports in the OpenFlow switch have the same feature for the feature types.

When the port is tagged with multiple port group identifiers, since each port group identifier tagged to the port corresponds to a different feature type, to distinguish between different feature types, a value range of the port group identifiers corresponding to each feature type cannot overlap with each other.

In step B, when learning that an OpenFlow controller needs to query for port information, the OpenFlow switch reports port group identifiers of port groups, to which each port of the OpenFlow switch or each port to be queried by the OpenFlow controller belongs, to the OpenFlow controller, herein the port groups are obtained by grouping the ports with different features in the OpenFlow switch based on one or more feature types, and each of the port groups has a port group identifier.

In this step, after the OpenFlow switch receives a port information query message sent by the OpenFlow controller, the OpenFlow switch replies to the OpenFlow controller with a port information reporting message which contains the port group identifiers of the port groups to which each port of the OpenFlow switch or each port in the port information query message belongs.

The port information of each port reported by the OpenFlow switch to the OpenFlow controller contains one or more port group identifiers, herein the one or more feature types described in step A are only limited to one or more feature types with feature differences between the ports in the OpenFlow switch, and each port group identifier corresponds to one feature of one feature type with feature differences between the ports.

In an exemplary embodiment, that the port information reporting message contains the port group identifiers of the port groups to which each port belongs includes:

the port information reporting message carries the port information of one or more ports in the OpenFlow switch, and the port information of each port includes the number of contained port group identifiers in the port information and a value of each port group identifier.

In step C, when the OpenFlow switch learns that the OpenFlow controller needs to query for feature information of a first feature type, the OpenFlow switch reports a port group identifier of each of the port groups, obtained by grouping based on the first feature type, to the OpenFlow controller.

In this step, after the OpenFlow switch receives a feature information query message of the first feature type sent by the OpenFlow controller, the OpenFlow switch replies to the OpenFlow controller with a feature information reporting message of the first feature type, and the feature information reporting message contains the port group identifier of each of the port groups obtained by grouping based on the first feature type.

Accordingly, the feature types may include, but be not limited to, one of:

table feature information and group feature information.

When the OpenFlow controller sends a table feature information query message, the feature information reporting message replied by the OpenFlow switch further carries the table feature information; and when the OpenFlow controller sends a group feature information query message, the feature information reporting message replied by the OpenFlow switch further carries the group feature information.

In an exemplary embodiment, if the one or more feature types described in step A are only limited to one or more feature types with feature differences between the ports in the OpenFlow switch, then in the feature information reporting message, only feature information of feature types with feature differences between the ports contains the port group identifiers, that is, the feature information of each feature type with feature differences between the ports, which is reported by the OpenFlow switch to the OpenFlow controller, contains one or more port group identifiers.

In an exemplary embodiment, different feature information corresponding to different values of the port group identifiers contained in the feature information is reported respectively by a specific implementing manner. The specific implementing manner may refer to replying with a plurality of feature information reporting messages, respectively, or may refer to dividing one feature information reporting message into multiple parts that contain different feature information.

That the OpenFlow switch replies to the OpenFlow controller with the feature information reporting message of the first feature type may include:

the OpenFlow switch replies to the OpenFlow controller with N feature information reporting messages of the first feature type, herein N is the number of the port groups obtained by grouping based on the first feature type, and each of the feature information reporting messages contains one port group identifier, and the port group identifier contained in each of the feature information reporting messages is different from each other and belongs to a port group identifier of a port group obtained by grouping based on the first feature type;

or the OpenFlow switch replies to the OpenFlow controller with one feature information reporting message of the first feature type, and the feature information carried in the feature information reporting message includes port group identifier/identifiers of one or more port groups obtained by grouping based on the first feature type.

In the present embodiment, the port group identifiers contained in the feature information are associated with the port group identifiers contained in the port information by taking the same values, so that the OpenFlow switch can not only report the grouping situation of the ports but also report features of each group of the ports respectively to the OpenFlow controller.

There is no necessary order relationship between the above steps B and C. When the port information query message sent by the OpenFlow controller is received, step B will be executed. When the feature information query message (such as but not limited to table and/or group feature query messages) of the first feature type sent by the OpenFlow controller is received, step C will be executed.

Implementing Example One

Figure 4:
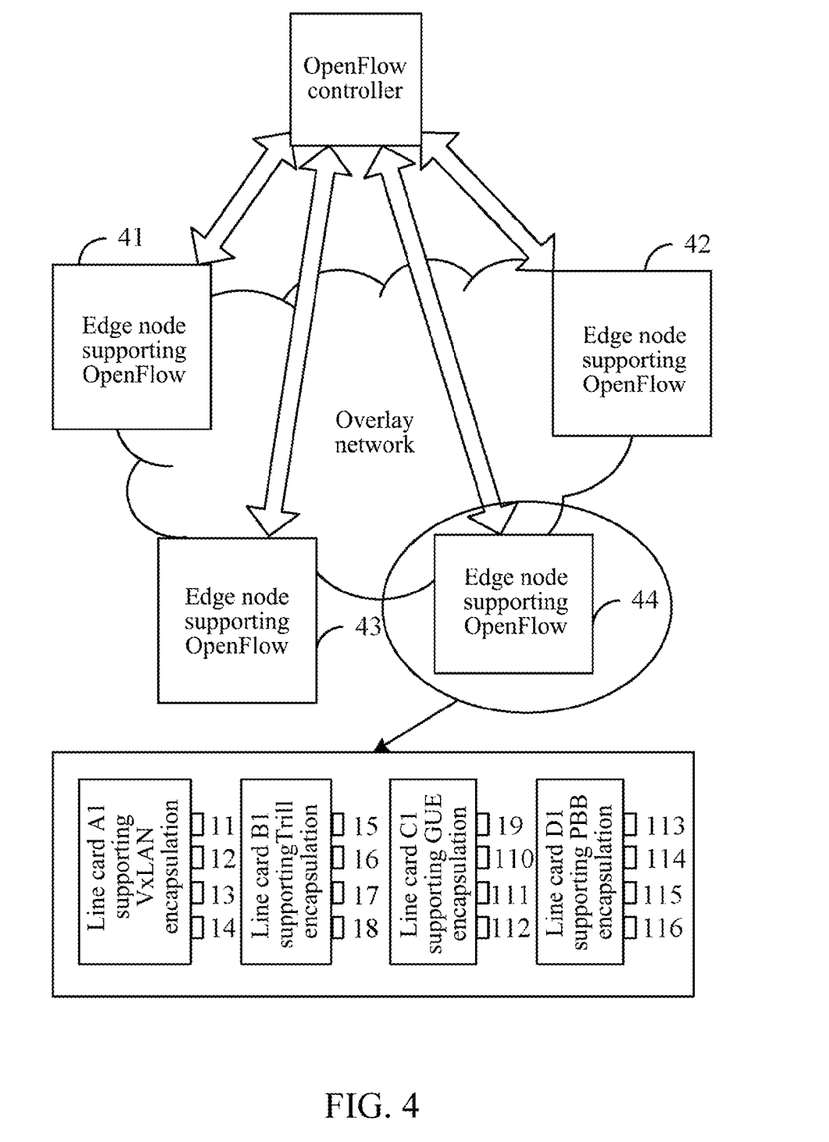
FIG. 4 is a schematic diagram of an application scenario in which different line cards support different overlay network encapsulation protocols according to an implementing example one of the present disclosure.

FIG. 4 is a schematic diagram of an application scenario in which different line cards support different overlay network encapsulation protocols according to the implementing example one. As shown in FIG. 4, in the present implementing example, edge nodes (OpenFlow switches in this example) 41, 42, 43, 44 supporting OpenFlow in the overlay network are connected to an OpenFlow controller respectively. The edge nodes 41, 42, 43, and 44 respectively contains a line card A1 supporting the VxLAN encapsulation, a line card B1 supporting the Trill encapsulation, a line card C1 supporting the GUE encapsulation and a line card D1 supporting the PBB encapsulation. Herein, the line card A1 contains ports 11, 12, 13, 14, and the line card B1 contains ports 15, 16, 17, 18, and the line card C1 contains ports 19, 110, 111, 112, and the line card D1 contains ports 113, 114, 115, 116.

In this implementing example, the OpenFlow controller and the edge nodes supporting the OpenFlow in the overlay network perform the following steps S401-S403.

In step S401, the OpenFlow switches 41, 42, 43, 44 group ports with different features based on table features and assign a port group identifier to each port group.

Specifically, the ports 11, 12, 13, and 14 of the line card A1 are the first port group and are all assigned the first port group identifier. The ports 15, 16, 17, and 18 of the line card B1 are the second port group and are all assigned the second port group identifier. The ports 19, 110, 111, 112 of the line card C1 are the third port group and are all assigned the third port group identifier. The ports 113, 114, 115, 116 of the line card D1 are the fourth port group and are all assigned the fourth port group identifier. Values of the first, second, third, and fourth port group identifiers are different from each other.

In step S402, after receiving a port information query message sent by the OpenFlow controller, the OpenFlow switches 41, 42, 43, 44 reply to the OpenFlow controller with port information reporting messages, which contain port group identifiers.

Specifically, port information of the ports 11, 12, 13, and 14 of the line card A1 reported by the OpenFlow switches 41, 42, 43, and 44 all contains the first port group identifier, and the reported port information of the ports 15, 16, 17 and 18 of the line card B1 all contains the second port group identifier, and the reported port information of the ports 19, 110, 110, and 112 of the line card C1 all contains the third port group identifier and the reported port information of the ports 113, 114, 115, and 116 of the line card D1 all contains the fourth port group identifier.

In step S403, after receiving a table feature information query message sent by the OpenFlow controller, the Open- Flow switches 41, 42, 43, 44 reply to the OpenFlow controller with table feature information reporting messages which contain the port group identifiers.

Specifically, table feature information of the first port group reported by the OpenFlow switches 41, 42, 43, 44 contains the first port group identifier and indicates that the first port group supports performing of a table action of the VxLAN encapsulation/decapsulation; the reported table feature information of the second port group contains the second port group identifier and indicates that the second port group supports performing of a table action of the Trill encapsulation/decapsulation; the reported table feature information of the third port group contains the third port group identifier and indicates that the third port group supports performing of a table action of the GUE encapsulation/decapsulation; and the reported table feature information of the fourth port group contains the fourth port group identifier and indicates that the fourth port group supports performing of a table action of the PBB encapsulation/decapsulation.

There is no necessary order relationship between the above steps S402 and S403. When the port information query message sent by the OpenFlow controller is received, step S402 will be executed. When the table feature information query message sent by the OpenFlow controller is received, step S403 will be executed.

Implementing Example Two

Figure 5:
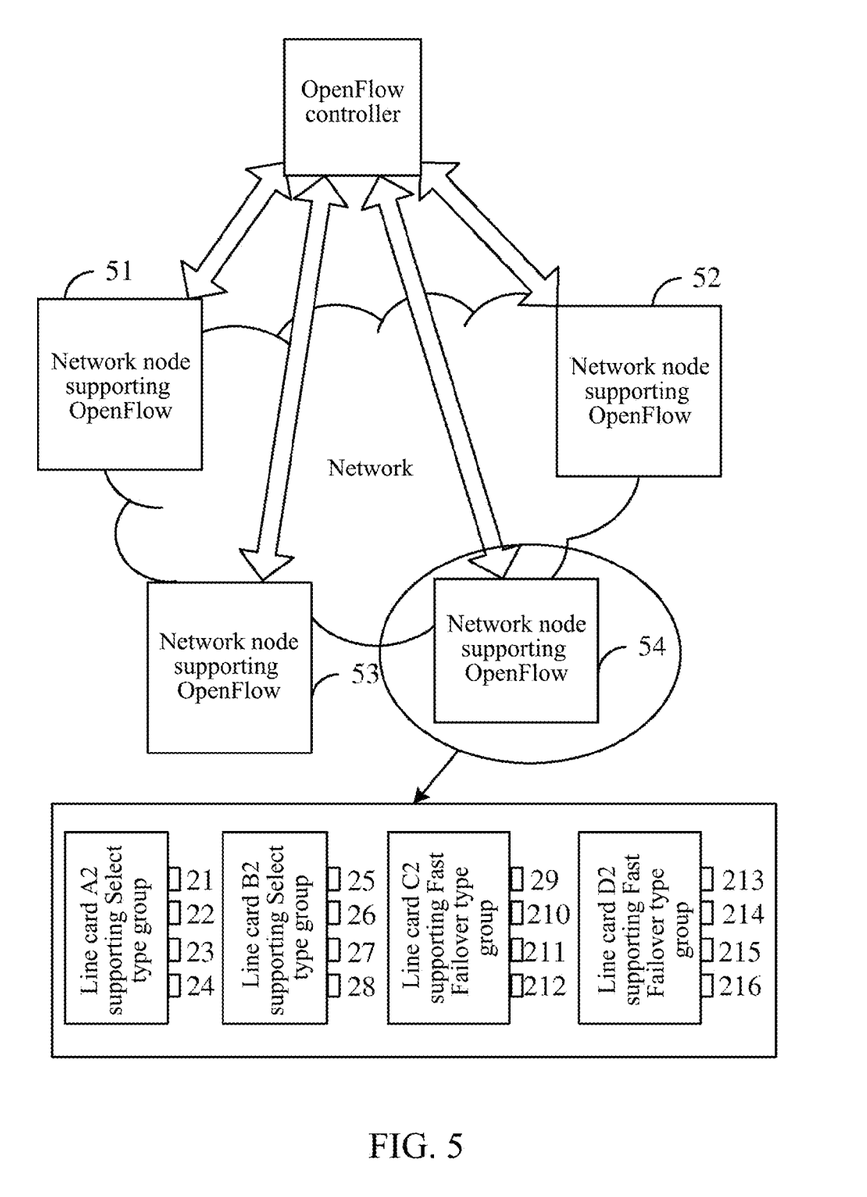
FIG. 5 is a schematic diagram of an application scenario in which different line cards support different group types according to an implementing example two of the present disclosure.

FIG. 5 is a schematic diagram of an application scenario in which different line cards support different group types according to the implementing example two. As shown in FIG. 5, in the present implementing example, network nodes (OpenFlow switches in this example) 51, 52, 53, 54 supporting OpenFlow in the network are connected to an OpenFlow controller respectively. The network nodes 51, 52, 53, and 54 respectively contain line cards A2 and B2 supporting the Select type group and line cards C2 and D2 supporting the Fast Failover type group. Herein, the line card A2 contains ports 21, 22, 23, 24, and the line card B2 contains ports 25, 26, 27, 28, and the line card C2 contains ports 29, 210, 211, 212, and the line card D2 contains ports 213, 214, 215, 216.

In this implementing example, the OpenFlow controller and the network nodes supporting the OpenFlow in the network perform the following steps S501-503.

In step S501, the OpenFlow switches 51, 52, 53, 54 group ports with different features based on group features, and assign a port group identifier to each port group.

Specifically, the ports 21, 22, 23, and 24 of the line card A2 and the ports 25, 26, 27, and 28 of the line card B2 are the first port group and are all assigned the first port group identifier. The ports 29, 210, 211, 212 of the line card C2 and the ports 213, 214, 215, 216 of the line card D2 are the second port group and are all assigned the second port group identifier. Values of the first and second port group identifiers are different from each other.

In step S502, after receiving a port information query message sent by the OpenFlow controller, the OpenFlow switches 51, 52, 53, 54 reply to the OpenFlow controller with port information reporting messages which contain the port group identifiers.

Specifically, port information of the ports 21, 22, 23, and 24 of the line card A2 and the ports 25, 26, 27 and 28 of the line card B2, reported by the OpenFlow switches 51, 52, 53 and 54, all contains the first port group identifier, and the reported port information of the ports 29, 210, 210, and 212 of the line card C2 and the ports 213, 214, 215, and 216 of the line card D2 all contains the second port group identifier.

In step S503, after receiving a group feature information query message sent by the OpenFlow controller, the OpenFlow switches 51, 52, 53, 54 reply to the OpenFlow controller with group feature information reporting messages which contain the port group identifiers.

Specifically, group feature information of the first port group reported by the OpenFlow switches 51, 52, 53, 54 contains the first port group identifier and indicates that the first port group supports the Select type group; and the reported group feature information of the second port group contains the second port group identifier and indicates that the second port group supports the Fast Failover type group.

There is no necessary order relationship between the above steps S502 and S503. When the port information query message sent by the OpenFlow controller is received, step S502 will be executed. When the group feature information query message sent by the OpenFlow controller is received, step S503 will be executed.

Implementing Example Three

Figure 6:
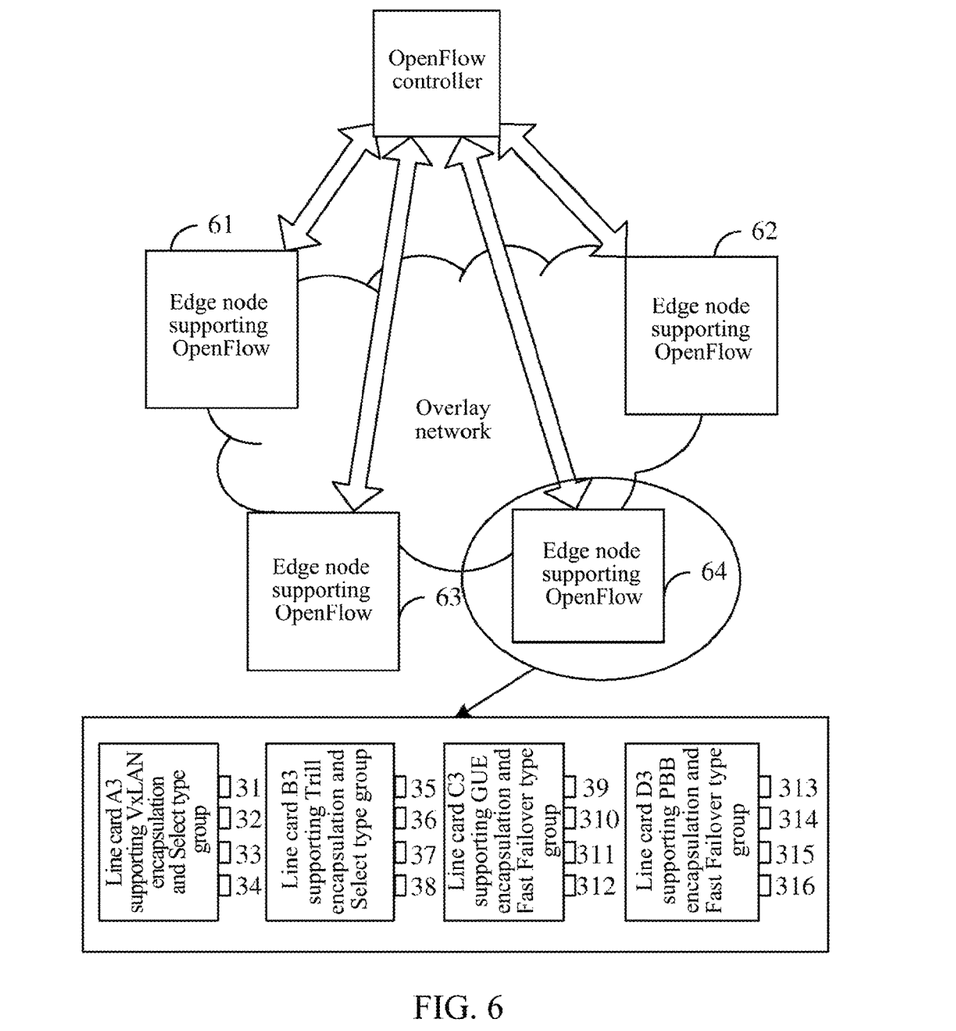
FIG. 6 is a schematic diagram of an application scenario in which at the same time different line cards support different overlay network encapsulation protocols and different line cards support different group types according to an implementing example three of the present disclosure.

FIG. 6 is a schematic diagram of an application scenario in which at the same time different line cards support different overlay network encapsulation protocols and different line cards support different group types according to the implementing example three. As shown in FIG. 6, in the present implementing example, edge nodes (OpenFlow switches in this example) 61, 62, 63, 64 supporting OpenFlow in the overlay network are connected to an OpenFlow controller respectively. The edge nodes 61, 62, 63, and 64 respectively contain a line card A3 supporting the VxLAN encapsulation and Select type group, a line card B3 supporting the Trill encapsulation and Select type group, a line card C3 supporting the GUE encapsulation and Fast Failover type group and a line card D3 supporting the PBB encapsulation and Fast Failover type group. Herein, the line card A3 contains ports 31, 32, 33, 34, and the line card B3 contains ports 35, 36, 37, 38, and the line card C3 contains ports 39, 310, 311, 312, and the line card D3 contains ports 313, 314, 315, 316.

In this implementing example, the OpenFlow controller and the edge nodes supporting the OpenFlow in the overlay network perform the following steps S601-S604.

In step S601, the OpenFlow switches 61, 62, 63, 64 group the ports with different features based on table features and group features and assign a port group identifier to each port group.

Specifically, to distinguish port group identifiers assigned based on the table features from port group identifiers assigned based on the group features, value ranges of the two kinds of port group identifiers cannot overlap. A result of grouping the ports with different features based on the table features are that the ports 31, 32, 33, and 34 of the line card A3 are the first port group and are all assigned the first port group identifier, and the ports 35, 36, 37, and 38 of the line card B3 are the second port group and are all assigned the second port group identifier, and the ports 39, 310, 311, 312 of the line card C3 are the third port group and are all assigned the third port group identifier, and the ports 313, 314, 315, 316 of the line card D3 are the fourth port group and are all assigned the fourth port group identifier. A result of grouping the ports with different features based on the group features are that the ports 31, 32, 33, and 34 of the line card A3 and the ports 35, 36, 37, and 38 of the line card B3 are the fifth port group and are all assigned the fifth port group identifier, and the ports 39, 310, 311, 312 of the line card C3 and the ports 313, 314, 315, 316 of the line card D3 are the sixth port group and are all assigned the sixth port group identifier. Herein, values of the first, second, third and fourth port group identifiers are different from each other; values of the fifth and sixth port group identifiers are different from each other. In addition, Value ranges of the first, second, third and fourth port group identifiers (e.g., numerical number 1-10) are different from value ranges of the fifth and sixth port group identifiers (e.g., numerical number 11-20).

In step S602, after receiving a port information query message sent by the OpenFlow controller, the OpenFlow switches 61, 62, 63, 64 reply to the OpenFlow controller with port information reporting messages which contain the port group identifiers.

Specifically, port information of the ports 31, 32, 33, and 34 of the line card A3 reported by the OpenFlow switches 61, 62, 63, and 64 all contains the first port group identifier and the fifth port group identifier. And the reported port information of the ports 35, 36, 37 and 38 of the line card B3 all contains the second port group identifier and the fifth port group identifier. The reported port information of the ports 39, 310, 310, and 312 of the line card C3 contains the third port group identifier and the sixth port group identifier. The reported port information of the ports 313, 314, 315, and 316 of the line card D3 contains the fourth port group identifier and the sixth port group identifier.

In step S603, after receiving a table feature information query message sent by the OpenFlow controller, the OpenFlow switches 61, 62, 63, 64 reply to the OpenFlow controller with table feature information reporting messages which contain the port group identifiers of various port groups obtained by grouping based on the table features.

Specifically, table feature information of the first port group reported by the OpenFlow switches 61, 62, 63, 64 contains the first port group identifier and indicates that the first port group supports performing of a table action of the VxLAN encapsulation/decapsulation. And the reported table feature information of the second port group contains the second port group identifier and indicates that the second port group supports performing of a table action of the Trill encapsulation/decapsulation. The reported table feature information of the third port group contains the third port group identifier and indicates that the third port group supports performing of a table action of the GUE encapsulation/decapsulation. The reported table feature information of the fourth port group contains the fourth port group identifier and indicates that the fourth port group supports performing of a table action of the PBB encapsulation/decapsulation.

In step S604, after receiving a group feature information query message sent by the OpenFlow controller, the OpenFlow switches 61, 62, 63, 64 reply to the OpenFlow controller with group feature information reporting messages which contains the port group identifiers of various port groups obtained by grouping based on the group features.

Specifically, group feature information of the fifth port group reported by the OpenFlow switches 61, 62, 63, 64 contains the fifth port group identifier and indicates that the fifth port group supports the Select type group; and the reported group feature information of the sixth port group contains the sixth port group identifier and indicates that the sixth port group supports the Fast Failover type group.

There is no necessary order relationship between the above steps S602, S603 and S604. When the port information query message sent by the OpenFlow controller is received, step S602 will be executed. When the table feature information query message sent by the OpenFlow controller is received, step S603 will be executed. When the group feature information query message sent by the OpenFlow controller is received, step S604 will be executed.

An embodiment of the present disclosure further provides a computer readable storage medium where computer-executable instructions are stored, and computer-executable instructions are used to execute the methods described above.

Figure 7:
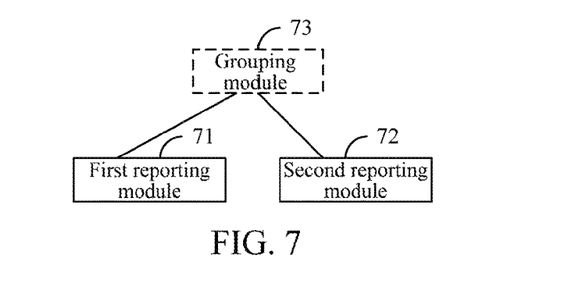
FIG. 7 is a schematic diagram of an apparatus for reporting a feature of an OpenFlow switch according to an embodiment two of the present disclosure.

The embodiment two provides an apparatus for reporting a feature of an OpenFlow switch, which is provided in the OpenFlow switch. As shown in FIG. 7, the apparatus includes:

a first reporting module 71 configured to, when learning that an OpenFlow controller needs to query for port information, report port group identifiers of port groups, to which each port of the OpenFlow switch or each port to be queried by the OpenFlow controller belongs, to the OpenFlow controller. Herein, the port groups are obtained by grouping ports with different features in the OpenFlow switch based on one or more feature types, and each of the port groups has a port group identifier.

In an exemplary embodiment, the apparatus further includes:

a second reporting module 72 configured to, when learning that the OpenFlow controller needs to query for feature information of a first feature type, report a port group identifier of each of the port groups, obtained by grouping based on the first feature type, to the OpenFlow controller.

In an exemplary embodiment, the apparatus further includes a grouping module 73 (the grouping module is denoted by a dashed box in FIG. 7, indicating that the grouping module is optional) configured to group the ports with different features in the OpenFlow switch based on the one or more feature types, and assign a port group identifier to each port group. The grouping module may not be provided in the OpenFlow switch; or the grouping module may not be included and the ports are grouped manually. The grouping situation and the assigned port group identifier can be stored in advance in the OpenFlow switch as configuration information.

In an exemplary embodiment, the port group identifiers of the port groups to which each port belongs includes:

the number of the contained port group identifiers and a value of each port group identifier.

In an exemplary embodiment, the feature types include one of:

table features and group features.

In an exemplary embodiment, the one or more feature types on which the grouping is based include one or more feature types with feature differences between the ports in the OpenFlow switch.

In an exemplary embodiment, there is no overlap between value ranges of port group identifiers corresponding to different feature types.

In an exemplary embodiment, the second reporting module is configured to report the port group identifier of each of the port groups, obtained by grouping based on the first feature type, to the OpenFlow controller by the following manner:

the first reporting module replies to the OpenFlow controller with N feature information reporting messages of the first feature type, herein N is the number of the port groups obtained by grouping based on the first feature type, and each of the feature information reporting messages contains a port group identifier, and the port group identifier contained in each of the feature information reporting messages is different from each other and belongs to a port group identifier of a port group obtained by grouping based on the first feature type.

In an exemplary embodiment, the second reporting module is configured to report the port group identifier of each of the port groups, obtained by grouping based on the first feature type, to the OpenFlow controller by the following manner:

the second reporting module replies to the OpenFlow controller with one feature information reporting message of the first feature type, herein feature information carried in the feature information reporting message contains port group identifiers of one or more port groups obtained by grouping based on the first feature type.

Those ordinarily skilled in the art can understand that all or part of steps in the methods described above can be carried out by the related hardware (such as processors) through programs. The programs can be stored in a computer readable storage medium, such as a read only memory, a magnetic disk or an optical disk or the like. In an exemplary embodiment, all or some of the steps of the abovementioned embodiments may also be implemented by using one or more integrated circuits. Accordingly, various modules/units in the embodiments can be implemented in the form of hardware, for example, by using an integrated circuit to implementation their corresponding functions, or can be implemented in the form of a software function module, for example, by executing programs/instructions stored in a memory through a processor to implement their corresponding functions. The present disclosure is not limit to any specific form of the combination of the hardware and software.

The embodiments disclosed in the present disclosure are described above, but they are only embodiments of the present disclosure used for understanding the present disclosure easily, and they are not used for limiting the present disclosure. Those skilled in the art can make any modification and change in the forms and details of the implementation without departing from the essence and scope of the present disclosure, but the patent protection scope of the present disclosure is subject to the scope defined by the appended claims.

INDUSTRIAL APPLICABILITY

The above technical solution greatly increases the flexibility of reporting of the features of the OpenFlow switch, and the reporting of the features of the OpenFlow switch with the port group granularity can be supported.

What is claimed is:

1. A method for reporting a feature of an OpenFlow switch comprising:
   after the OpenFlow switch receives a port information query message sent by an OpenFlow controller, reporting port group identifiers of port groups, to which each port of the OpenFlow switch or each port to be queried by the OpenFlow controller belongs, to the OpenFlow controller, wherein port groups are obtained by grouping ports with different features in the OpenFlow switch for a certain feature type, and each of the port groups has a port group identifier.

2. The method according to claim 1, wherein after the OpenFlow switch receives the port information query message sent by the OpenFlow controllers and acquires that the OpenFlow controller needs to query for feature information of a first feature type, the method further comprises:
   reporting, by the OpenFlow switch, the port group identifier of each of the port groups, obtained by grouping for the first feature type, to the OpenFlow controller.

3. The method according to claim 2, wherein the reporting, by the OpenFlow switch, the port group identifier of each of the port groups, obtained by grouping for the first feature type, to the OpenFlow controller comprises:
   replying, by the OpenFlow switch, to the OpenFlow controller with N feature information reporting messages of the first feature type, wherein N is a number of the port groups obtained by grouping for the first feature type, and each feature information reporting message contains a port group identifier, and the port group identifier contained in the each feature information reporting message is different from each other and belongs to a port group identifier of a port group obtained by grouping for the first feature type.

4. The method according to claim 2, wherein the reporting, by the OpenFlow switch, the port group identifier of each of the port groups, obtained by grouping for the first feature type, to the OpenFlow controller comprises:
   replying, by the OpenFlow switch, to the OpenFlow controller with one feature information reporting message of the first feature type, wherein feature information carried in the feature information reporting message contains port group identifier/identifiers of one or more port groups obtained by grouping for the first feature type.

5. The method according to claim 1, wherein the feature types comprises one of:
   table features and group features.

6. The method according to claim 1, wherein
   the feature type for which the grouping is performed comprises a feature type with feature differences between the ports in the OpenFlow switch.

7. The method according to claim 1, wherein
   there is no overlap between value ranges of port group identifiers corresponding to different feature types.

8. The method according to claim 1, before the step of the OpenFlow switch receiving a port information query message sent by an OpenFlow controller, further comprising:
   grouping, by the OpenFlow switch, the ports with different features for a certain feature type, and assigning the port group identifier to each port group.

9. The method according to claim 1, wherein the port group identifiers of the port groups to which each port belongs comprises:
   a number of contained port group identifiers, and a value of each of the port group identifiers.

10. An apparatus for reporting a feature of an OpenFlow switch provided in the OpenFlow switch and comprising a processor and a memory, wherein the memory stores processor-executable programs, and the programs comprise:
    a first reporting module configured to, after the OpenFlow switch receives a port information query message sent by an OpenFlow controller, report port group identifiers of port groups, to which each port of the OpenFlow switch or each port to be queried by the OpenFlow controller belongs, to the OpenFlow controller, wherein port groups are obtained by grouping ports with different features in the OpenFlow switch for a certain feature type, and each of the port groups has a port group identifier.

11. The apparatus according to claim 10, wherein the programs further comprise:
    a second reporting module configured to, after the OpenFlow switch receives the port information query message sent by the OpenFlow controllers and acquires that the OpenFlow controller needs to query for feature information of a first feature type, report the port group identifier of each of the port groups, obtained by grouping for the first feature type, to the OpenFlow controller.

12. The apparatus according to claim 11, wherein the second reporting module is configured to report the port group identifier of each of the port groups, obtained by grouping for the first feature type, to the OpenFlow controller by the following manner:

replying to the OpenFlow controller with N feature information reporting messages of the first feature type, wherein N is a number of the port groups obtained by grouping for the first feature type, and each feature information reporting message contains a port group identifier, and the port group identifier contained in the each feature information reporting message is different from each other and belongs to a port group identifier of a port group obtained by grouping for the first feature type.

13. The apparatus according to claim 11, wherein the second reporting module is configured to report the port group identifier of each of the port groups, obtained by grouping for the first feature type, to the OpenFlow controller by the following manner:

replying, by the second reporting module, to the OpenFlow controller with one feature information reporting message of the first feature type, wherein feature information carried in the feature information reporting message contains port group identifier/identifiers of one or more port groups obtained by grouping for the first feature type.

14. The apparatus according to claim 10, wherein the feature types comprises one of:
table features and group features.

15. The apparatus according to claim 10, wherein
the feature types for which the grouping is performed comprises a feature types with feature differences between the ports in the OpenFlow switch.

16. The apparatus according to claim 10, wherein
there is no overlap between value ranges of port group identifiers corresponding to different feature types.

17. The apparatus according to claim 10, wherein the programs further comprise:
a grouping module configured to group the ports with different features for a certain feature type, and assign the port group identifier to each port group.

18. The apparatus according to claim 10, wherein the port group identifiers of the port groups to which each port belongs comprises:
a number of contained port group identifiers, and a value of each of the port group identifiers.

19. A non-transitory computer readable storage medium where computer-executable instructions are stored, wherein the computer-executable instructions are used to execute the method according to claim 1.

* * * * *